(12) United States Patent
Sime

(10) Patent No.: US 8,272,986 B2
(45) Date of Patent: Sep. 25, 2012

(54) TRANSMISSION WITH MECHANICALLY-BIASED CLUTCH

(75) Inventor: Karl Andrew Sime, Mason, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 523 days.

(21) Appl. No.: 12/474,682

(22) Filed: May 29, 2009

(65) Prior Publication Data

US 2010/0304912 A1    Dec. 2, 2010

(51) Int. Cl.
 *F16H 3/72* (2006.01)
 *F16D 13/00* (2006.01)

(52) U.S. Cl. .................. 475/5; 192/89.22; 192/89.2

(58) Field of Classification Search .......... 475/5; 477/3, 477/4, 5; 180/292, 65.21, 65.245, 65.5, 65.235; 192/89.22, 41 S, 89.2, 85.38, 85.39
See application file for complete search history.

(56) References Cited

U.S. PATENT DOCUMENTS

| | | | | |
|---|---|---|---|---|
| 4,361,217 A | * | 11/1982 | Bieber et al. | 192/103 FA |
| 4,391,354 A | * | 7/1983 | Bucksch | 188/71.5 |
| 4,706,789 A | * | 11/1987 | McColl et al. | 477/180 |
| 4,872,539 A | * | 10/1989 | Gay et al. | 192/98 |
| 4,997,074 A | * | 3/1991 | Larson et al. | 192/70.28 |
| 5,542,517 A | * | 8/1996 | Peruski | 192/85.25 |
| 5,743,369 A | * | 4/1998 | Lorriette | 192/85.49 |
| 5,931,275 A | * | 8/1999 | Kasuya et al. | 192/85.54 |
| 6,554,113 B2 | * | 4/2003 | Li et al. | 192/48.92 |
| 6,622,840 B2 | * | 9/2003 | Dau et al. | 192/48.91 |
| 6,790,161 B2 | * | 9/2004 | Yamasaki et al. | 477/181 |
| 7,819,232 B2 | * | 10/2010 | Ishida et al. | 192/96 |
| 7,980,980 B2 | * | 7/2011 | Rask et al. | 475/5 |
| 2008/0011574 A1 | * | 1/2008 | Yamasaki et al. | 192/70.28 |
| 2008/0264746 A1 | * | 10/2008 | Simpson et al. | 192/3.33 |
| 2008/0280726 A1 | | 11/2008 | Holmes et al. | |
| 2009/0095548 A1 | * | 4/2009 | Tamba et al. | 180/65.21 |
| 2009/0124451 A1 | * | 5/2009 | Rask et al. | 477/5 |
| 2010/0262322 A1 | * | 10/2010 | Yokouchi et al. | 701/22 |
| 2011/0147155 A1 | * | 6/2011 | Heitzenrater et al. | 192/48.6 |
| 2011/0315503 A1 | * | 12/2011 | Ari et al. | 192/85.63 |

* cited by examiner

*Primary Examiner* — Katy M Ebner
*Assistant Examiner* — Emma K Frick
(74) *Attorney, Agent, or Firm* — Quinn Law Group, PLLC

(57) ABSTRACT

A transmission configured for receiving power from an engine is provided with a normally-closed clutch in order to permit operation in modes requiring closure of the clutch even when hydraulic power from a pump powered by the engine or by rotation of a transmission member is not available, or is not of a sufficient pressure.

17 Claims, 5 Drawing Sheets

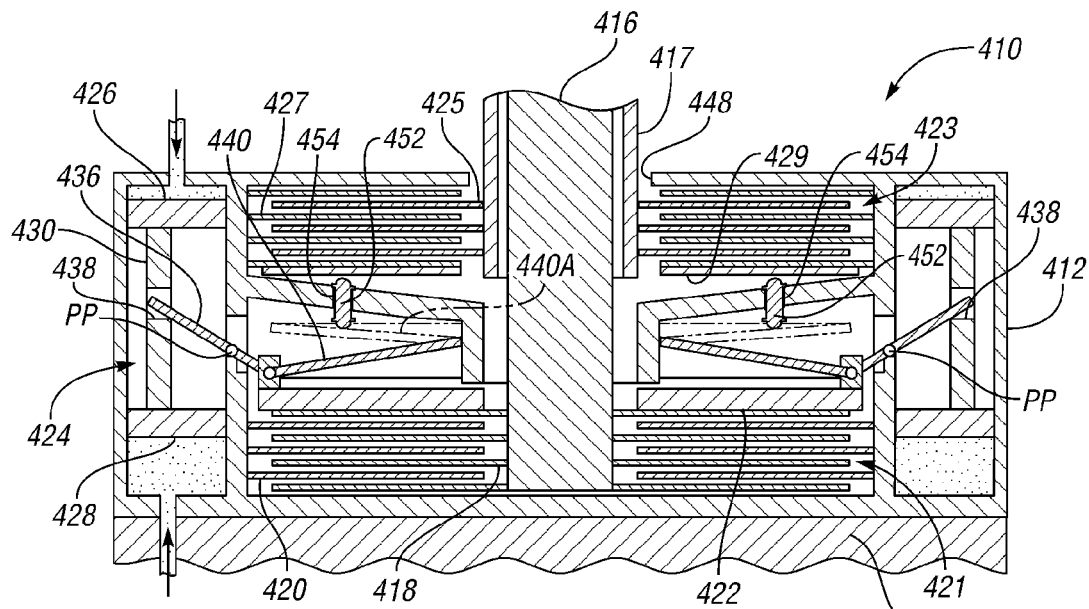

FIG. 7

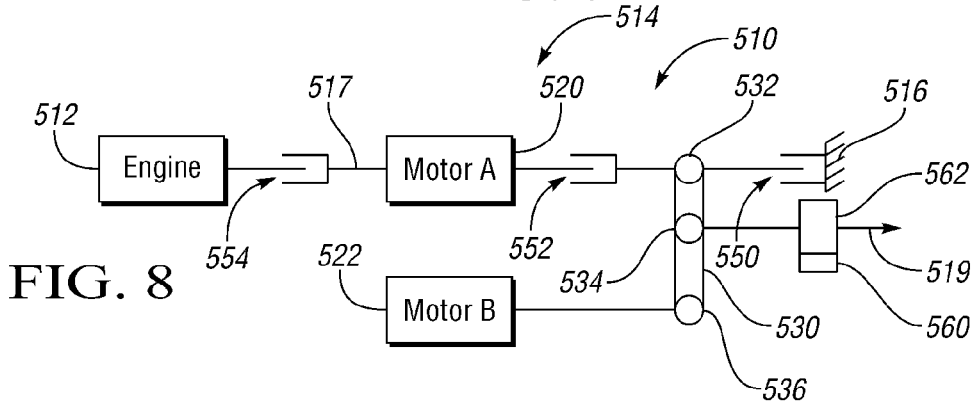

FIG. 8

| MODES | 550 | 552 | 554 |
|---|---|---|---|
| EV - Low Speed | Normally Closed (NC) at zero to Low Speed<br>NC + Boost Once Main Pump Primes @ Higher speeds | | |
| Series Engine On | Normally Closed (NC) at zero to Low Speed<br>NC + Boost Once Main Pump Primes @ Higher speeds | | X |
| Output Split Engine On | Toggle to Normally Open Position (Low Spin Loss) | X | X |
| EV - High Speed | Toggle to Normally Open Position (Low Spin Loss) | X | |
| Neutral | Toggle to Normally Open Position (Low Spin Loss) | | |

X = Engaged Clutch

FIG. 9

| Modes | 660 | 662 | 664 | 666 | 668 |
|---|---|---|---|---|---|
| Neut3 Estrt | | | X | | |
| ETC1 | X | | | | |
| ETC2 | | X | | | |
| EVT1 | X | | X | | |
| EVT2 | X | | | X | |
| EVT3 | | X | | X | |
| EVT4 | | X | X | | |
| EVT1/ EOFF | X | | X | | X |
| EVT3/ EOFF | | X | | X | |
| FG1 | X | | X | X | |
| FG2 | X | X | | X | |
| FG3 | | X | X | X | |

X = Engaged Clutch

TRANSMISSION WITH MECHANICALLY-BIASED CLUTCH

TECHNICAL FIELD

The invention relates to a transmission for a motor vehicle.

BACKGROUND OF THE INVENTION

Automotive transmissions often have hydraulically-actuated, selectively engagable torque-transmitting mechanisms, referred to as clutches. The clutches may be stationary-type clutches (i.e., brakes), or rotating-type clutches. Typically, interspaced sets of friction plates and reaction plates are placed in contact with one another when the clutch is engaged, to cause common rotation (in the case of the rotating-type clutch) or grounding (in the case of the stationary-type clutch) of components connected with the respective sets of plates.

Hydraulically-actuated clutches have inherent spin losses which reduce fuel economy. Spin losses are caused by fluid in the clutch increasing resistance to rotation of the components connected with the clutch plates.

Additionally, hydraulically-actuated clutches are not engagable until sufficient fluid pressure is available from a transmission pump. Typically, a main transmission pump is driven by an engine that is connected with the transmission or is driven by a rotatable transmission member, and so is indirectly driven by the engine. When the engine is off, such as in some hybrid operating modes, or when the engine output member is rotating at relatively low speeds, the main pump may not provide sufficient apply pressure. Accordingly, auxiliary pumps, such as electrically-powered pumps, are sometimes provided, especially in a hybrid transmission, to provide hydraulic pressure when pressure from the main pump is insufficient.

SUMMARY OF THE INVENTION

A transmission configured for receiving power from an engine is provided with a mechanically-biased clutch, such as a "normally-closed" clutch or a "normally-open clutch", in order to permit operation in modes requiring the clutch to maintain a closed or open state, respectively, even when hydraulic power from an engine-powered pump is not available, or is not of a sufficient pressure. The transmission includes an input member connectable with the engine, an output member, and a stationary member. A transmission gearing arrangement, such as one or more planetary gear sets, but not limited to such, is operatively connected between the input member and the output member. The gearing arrangement includes a plurality of rotatable gear members. As used herein, "gear members" include intermeshing gears of the non-planetary type, or planetary gear set members such as a ring gear member, a carrier member that supports pinion gears, or a sun gear member. The clutch has an engaged state and a disengaged state.

Different embodiments may use such a clutch for different purposes. For example, the clutch may transmit torque between one of the gear members and another of the gear members, between one of the gear members and the stationary member, or between the engine and the transmission when in the engaged state. The clutch does not transmit torque when in the disengaged state.

The clutch includes a mechanical member, such as a Belleville spring, selectively movable to a biasing position in which the mechanical member is configured to retain the clutch in the engaged state (if a normally-closed clutch), or in the disengaged state (if a normally-open clutch) without application of power, including at least hydraulic, pneumatic, and electrical power. A lever may be connected between the mechanical member and a hydraulic valve actuatable to move the mechanical member. The lever provides a mechanical advantage that allows the hydraulic valve to cause movement of the mechanical member with less hydraulic pressure.

One or more of such clutches may be used in various transmission embodiments. The clutch is especially useful in hybrid electromechanical transmissions, as it can remain engaged and transmit torque even in operating modes during which the engine is off and thus cannot power a hydraulic pump. Additionally, a normally-closed clutch reduces spin losses as fluid pressure is not required to maintain the engaged state. The reduction in spin losses results in improved fuel economy.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 7 is a schematic cross-sectional illustration of a fifth embodiment of a normally-closed clutch that is a double stationary-type clutch shown with a first of the clutches in an engaged state and shown in phantom with the first clutch in a disengaged state and the second clutch in an engaged state;

FIG. 8 is a schematic illustration of a first embodiment of a transmission having a normally-closed clutch;

FIG. 9 is a table showing operating modes and an engagement schedule for the clutches of FIG. 8;

DESCRIPTION OF THE PREFERRED EMBODIMENTS

Exemplary Mechanically-Biased Clutch Embodiments

Figure 1A:
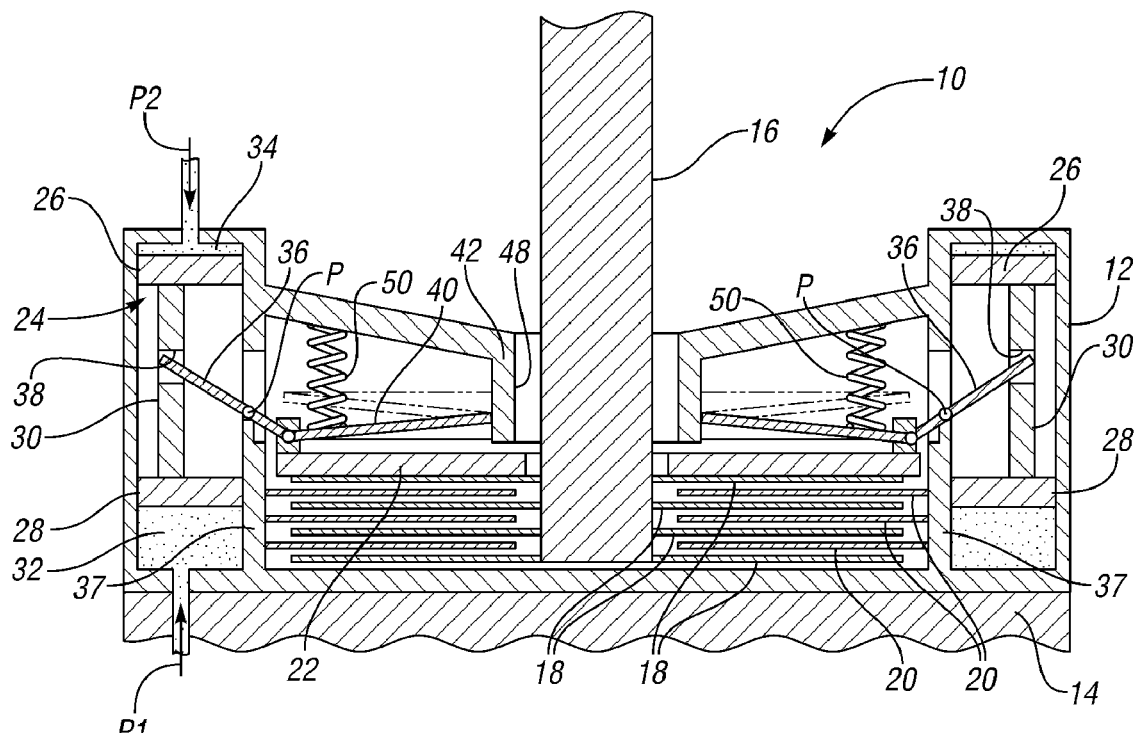
FIG. 1A is a schematic cross-sectional illustration of a first embodiment of a normally-closed clutch that is a single stationary-type clutch in an engaged state and shown in phantom in a disengaged state.

Referring to FIG. 1A, a mechanically-biased clutch 10 is shown in an engaged state, i.e., a closed state. The clutch 10 may be referred to as a normally-closed clutch, and includes a housing 12 connected to a stationary member 14, such as a transmission casing in an automotive transmission. The clutch 10 is referred to as a stationary-type clutch as it is operable to ground a rotatable member, such as shaft 16, to the stationary member 14.

The clutch 10 includes a first set of plates 18 splined to the shaft 16. The plates 18 are interspaced with a second set of plates 20 splined to the housing 12. The plates 18 may have a friction lining, and may be referred to as friction plates, while the plates 20 may be referred to as reaction plates. A reaction plate 22 is positioned adjacent the stacked plates 18, 20. In the engaged state, the reaction plate 22 is pushed against the stacked plates 18, 20 to cause them to come into contact with one another. Thus, friction forces between the plates 18, 20 prevent rotation of the plates 18, allowing the plates 18, housing 12 and stationary member 14 to serve as a reaction plate for any torque applied to the shaft 16.

The clutch 10 is moved to the closed or engaged state shown in FIG. 1A by selectively applying a differential hydraulic pressure to a hydraulic counter-balance valve 24 having two pistons 26, 28 connected by piston support 30. As shown in FIG. 1A, fluid with pressure P1 is applied to a first annular valve chamber 32, while fluid with a lesser pressure P2 is applied to a second annular valve chamber 34, causing the pistons 26, 28 to be located in the position shown in FIG. 1A. The pistons 26, 28 and piston support 30 are annular; accordingly, only one fluid inlet/outlet is required per chamber 32, 34.

Figure 2:
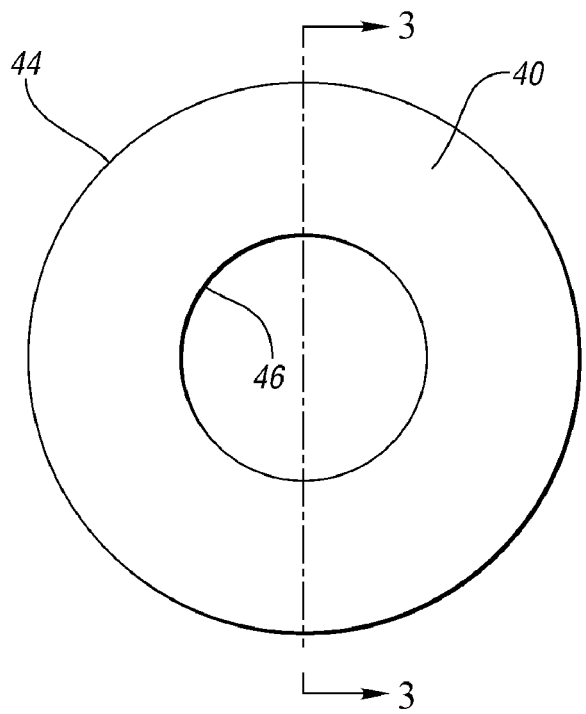
FIG. 2 is a top view illustration of a Belleville spring included in the clutch of FIGS. 1A and 1B.
Figure 3:
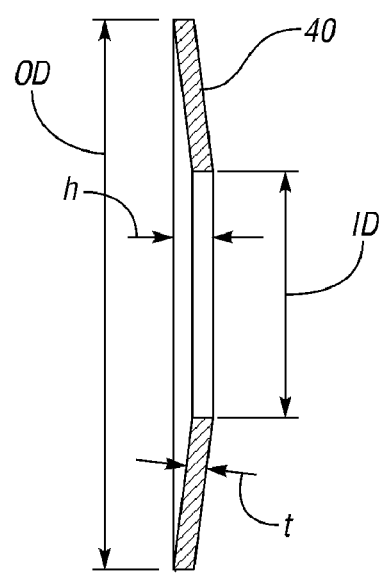
FIG. 3 is a cross-sectional view of the Belleville spring of FIG. 2 taken at the lines 3-3.

A plurality of levers 36 are mounted circumferentially around the housing 12, each pivotally secured at a respective pivot point P to an inner wall 37 of the housing. Each lever 36 has one end extending at least partially into a respective slot 38 formed in the piston support 30. Although only two levers 36 are visible in the cross-sectional view of FIG. 1A, many additional like levers are circumferentially spaced around the housing 12. An opposing end of each respective lever 36 is connected for movement with a mechanical member, which in this embodiment is a generally annular cone or disk-shaped bi-stable spring 40, such as a Belleville spring. Specifically, the levers 36 are hinged relatively near outer circumference 44 (shown in FIG. 2) of the spring 40. The spring 40 is fixed at inner circumference 46 (shown in FIG. 2) to a center wall 42 of the housing 12. The center wall 42 defines the opening 48 through which the shaft 16 extends. The spring 40 is best shown in FIGS. 2 and 3, and has inner circumference 46 with an inner diameter ID, and outer circumference 44 with outer diameter OD. In an unstressed state, the spring has a height h between the outer circumference 44 and the inner circumference 46, and a thickness t. The dimensions of the spring 40 are selected to ensure that the spring 40 can be flexed via the levers 36 to move the outer circumference 44 from the first position of FIG. 1A to the second position of FIG. 1B relative to the stationary inner circumference 46 fixed to the housing wall 42.

Figure 1B:
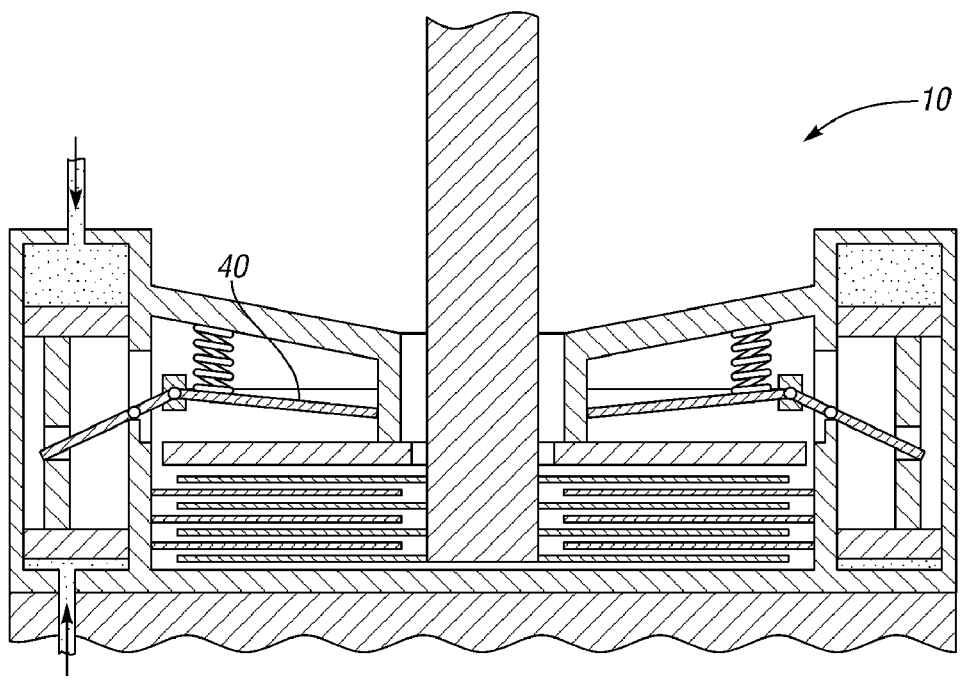
FIG. 1B is a schematic cross-sectional illustration of the normally-closed clutch of FIG. 1A shown in the disengaged state.

Thus, as hydraulic pressure in the chambers 32, 34 is controlled to move the support member 30 from the position in FIG. 1A to the position in FIG. 1B, by increasing the hydraulic pressure P2 relative to hydraulic pressure P1, the levers 36 pivot at points P, causing the spring 40 to move to the position of FIG. 1B shown as 40A and referred to as a disengaged state, or as a normally-open position. The spring 40 is biased to maintain the position of FIG. 1B once therein. The levers are configured so that the portions between the pivot points P and the piston support 30 are significantly longer that the portions between the pivot points P and the outer circumference 44 of the spring 40.

Accordingly, the levers 36 provide a mechanical advantage, decreasing clutch deactivation pressure and increasing clutch gain. That is, the levers 36 allow movement of the spring 40 with a lower actuation force, i.e., lower hydraulic pressure applied to the surface areas of the first piston 26 and the second piston 28, respectively, than would be required if the spring 40 were directly connected with the piston support 30 without a pivoting lever. For example, if the levers 36 are designed with a mechanical advantage of two, then they decrease by one-half the amount of pressure required to hold a given amount of torque. It should be appreciated, however, that in an alternative embodiment, the clutch 10 may be configured without levers 36, in which case greater actuation force will be required to move the spring 40.

Optional compression-type balance springs 50 are mounted between the housing 12 and the spring 40. The springs 50 may be spaced circumferentially around and secured to a side of the spring 40 opposite the plates 18, 20. When the spring 40 is in the engaged state of FIG. 1A, the springs 50 apply at least some compressive force to increase the "clamp force", i.e., the overall force holding the spring 40 against the apply plate 22. When the spring 40 is in the disengaged state of FIG. 1B, the springs 50 are further compressed, and apply force on the spring 40 to urge the spring 40 toward the engaged state. The springs 50 are configured so that the force applied to the spring 40 in the disengaged state is not sufficient to move the spring 40 to the engaged state, but reduces the necessary hydraulic pressure to move the spring 40 from the disengaged state to the engaged state.

Once in either the first position of FIG. 1A or the second position of FIG. 1B, the spring 40 is self-biased, as is understood for a Belleville spring, to remain in that position and require the application of force to be moved to the alternate position. The self-biasing nature of the spring 40 is not dependent on the presence of hydraulic pressure in the valve 24. Accordingly, the clutch 10 is configured so that the spring 40 can be moved to the position of FIG. 1A using hydraulic pressure, and will remain in that position, with the clutch 10 thus held in the engaged state, even when hydraulic pressure is not available or is insufficient to overcome force of the spring 40. Thus, if the clutch 10 is used in a vehicle transmission, the clutch 10 will remain in the engaged state even when an engine connected with the transmission is off, or is not running at a sufficiently high speed to power an engine-driven hydraulic pump that provides pressure to the valve 24. For example, the clutch 10 would remain in the engaged state if the transmission is powered by a motor/generator in an electric mode, without requiring an auxiliary pump to provide hydraulic pressure to the valve, as is typically required with clutches that are not normally-closed clutches. Furthermore, once in the disengaged state of FIG. 1B, the clutch 10 will remain in that state until hydraulic pressure sufficient to overcome the self-biasing spring 40 is applied. Thus, the clutch 10 may be implemented as a "normally-open" clutch.

Figure 4:
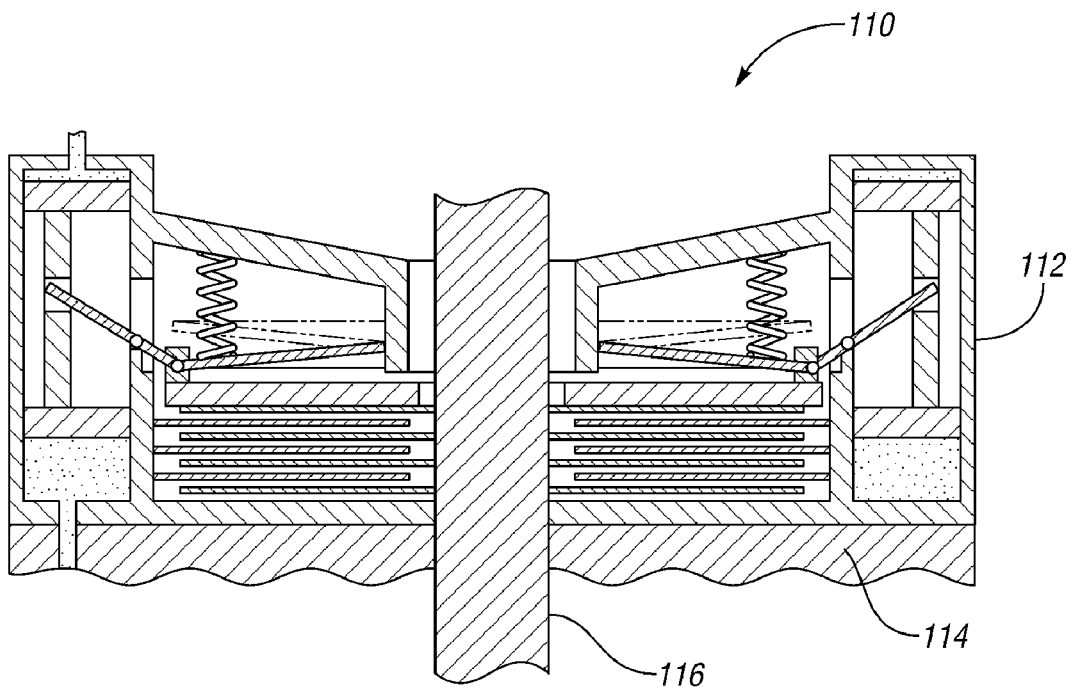
FIG. 4 is a schematic cross-sectional illustration of a second embodiment of a normally-closed clutch that is a single stationary-type clutch in an engaged state and shown in phantom in a disengaged state.

Referring to FIG. 4, another embodiment of a normally-closed clutch 110 is shown. Clutch 110 is alike in every aspect to clutch 10 described above, except that the housing 112 is configured to allow a shaft 116 to pass through the clutch 110 and the stationary member 114 to which the clutch 110 is attached. This configuration may be especially useful for particular applications within a transmission, such as if the shaft 116 is a transmission input member that must extend past the transmission casing, e.g., the stationary member 114, toward the engine.

Figure 5:
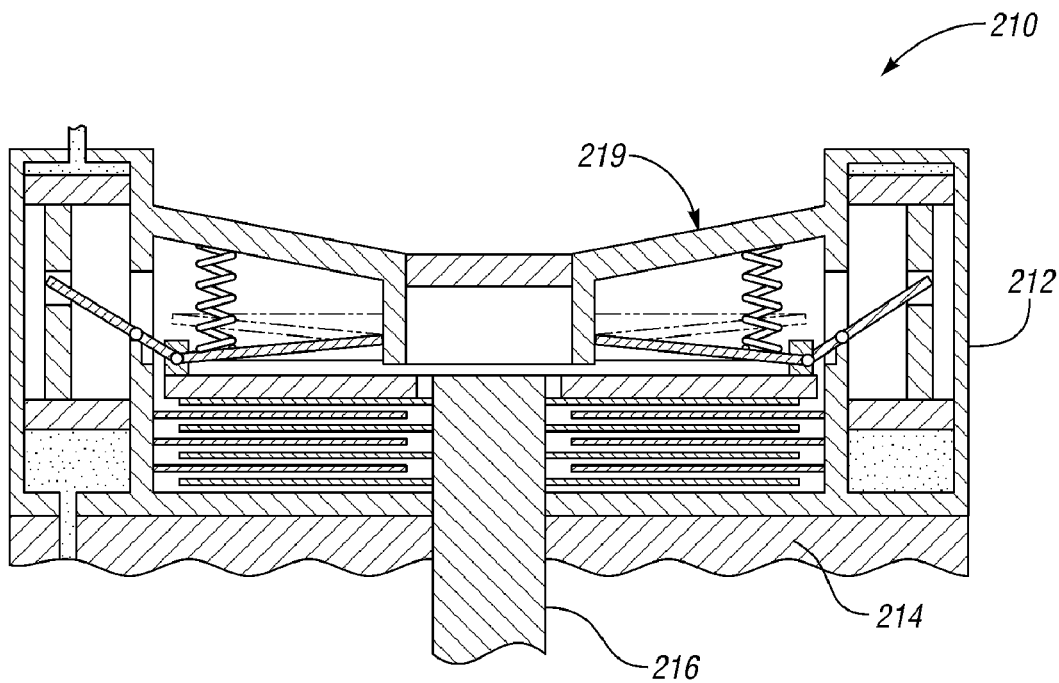
FIG. 5 is a schematic cross-sectional illustration of a third embodiment of a normally-closed clutch that is a single stationary-type clutch in an engaged state and shown in phantom in a disengaged state.

Referring to FIG. 5, another embodiment of a normally-closed clutch 210 is shown. Clutch 210 is alike in every aspect to clutch 10 described above, except that the housing 212 is configured so that shaft 216 passes through a stationary member 214 on an opposite side of the clutch 210 than does shaft 16. In alternative embodiments, a second selectively engagable stationary clutch could be mounted to surface 219 of housing 212. The second clutch would be a typical grounding clutch having a set of plates connected to the housing 212 and another set of plates connected with a rotatable shaft. The second clutch would be engagable via pressurized fluid from a hydraulic pump, and need not be a normally-closed clutch. In another alternative embodiment, surface 219, rather than the opposing surface as shown in FIG. 5, could be connected to stationary member 214.

Figure 6:
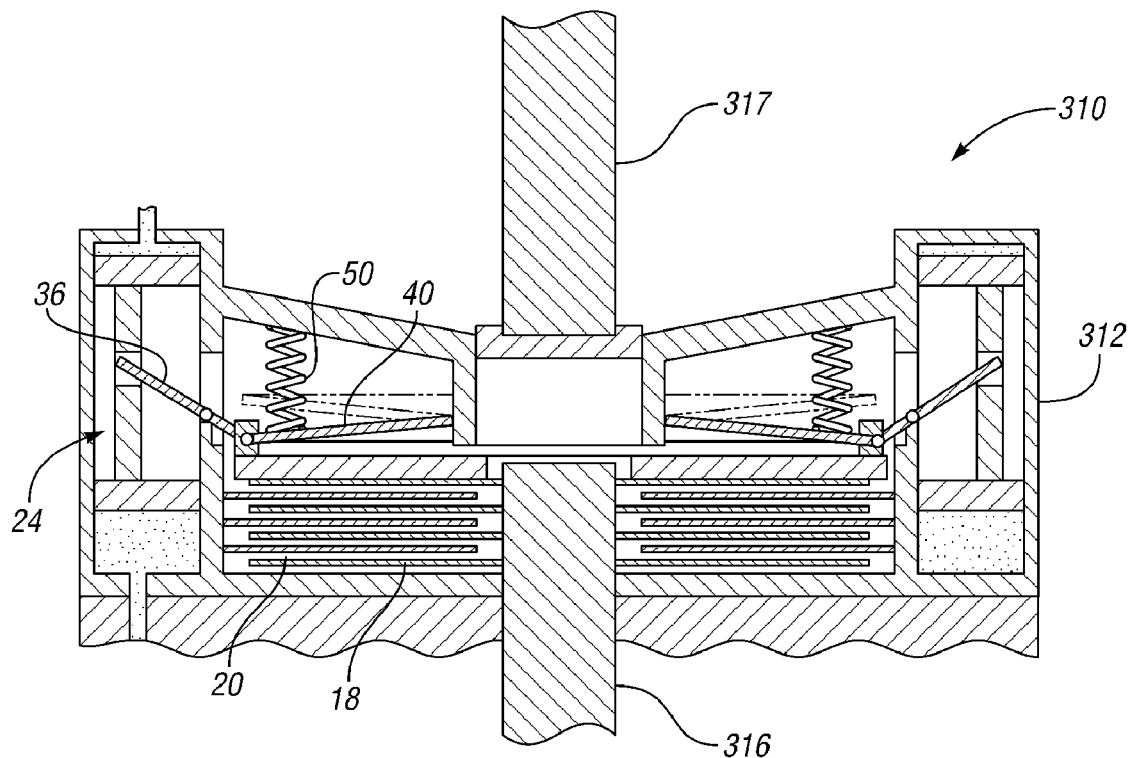
FIG. 6 is a schematic cross-sectional illustration of a fourth embodiment of a normally-closed clutch that is a single rotating-type clutch in an engaged state and shown in phantom in a disengaged state.

Referring to FIG. 6, a single rotating-type normally-closed clutch 310 is shown. A rotating shaft 317 is continuously connected to and rotates with a clutch housing 312. A shaft 316 is selectively connectable for common rotation with the housing 312, and hence with the shaft 317, by engagement of the first set of clutch plates 18 with the second set of clutch plates 20, as described with respect to clutch 10 of FIGS. 1A and 1B. Thus, when the clutch 310 is in the engaged state (the normally-closed state), shafts 316 and 317 rotate at the same speed. The hydraulic toggle valve 24, levers 36, Belleville spring 40, optional compression balance springs 50 are configured and function the same as described with respect to FIGS. 1A and 1B.

Referring to FIG. 7, a double stationary normally-closed clutch 410 is shown. The clutch 410 has a housing 412 that is continuously grounded to a stationary member 414. The housing 412 forms an opening 448 through which a first rotatable shaft 416 and a second rotatable shaft 417 pass. The shafts 416, 417 are concentric, with shaft 417 being a sleeve shaft. When the clutch 410 is installed in a transmission, the shafts 416, 417 are each separately connected with a different gear member, a motor/generator, an input member, etc. in the transmission. The double clutch 410 includes a first clutch 421 and a second clutch 423, both of which function as normally-closed clutches, with the clutches alternating being in the engaged state. The first clutch 421 includes a first set of plates 418 continuously connected with the first shaft 416. A second set of plates is continuously connected with the housing 412. A hydraulic toggle valve 424 controls the position of a spring 440 via a set of levers 436, as described above with respect to similar valve 24, spring 40 and levers 436. In FIG. 7, the spring 440 is shown in a first position pressing against an apply plate 422 to hold the clutch 421 in an engaged, normally-closed state, and thereby grounding the shaft 416 to the housing 412.

The hydraulic valve 424 is controlled to apply a differential pressure to pistons 426, 428, and thereby move piston support 430 and levers 436 captured through openings 438 such that the levers 436 pivot about pivot points PP to move the spring to a second position 440A shown in phantom. The pistons 426 and 428 and piston support 430 are annular, and only one hydraulic control is required for both clutches 421, 423.

A set of pins 452 are circumferentially-spaced about and held by a portion of the housing 412. The pins 452 are slidable with respect to the housing 412 within openings 454 in which they are held. The pins 452 have spaced flanges or other extensions that are positioned to interfere with the housing 412 to limit the translation of the pins 452 within the openings 454 and hold the pins 452 to the housing 412. The pins are configured so that when the spring 440 moves to the second position 440A, the spring 440 pushes the pins 452 against an apply plate 429 to engage the second clutch 423. Specifically, a set of plates 425 is continuously connected with the shaft 417. A set of plates 427 is continuously connected with the housing 412. When the pins 452 apply force to the apply plate 429, the plates 425 engage with the plates 427, to connect the shaft 417 to the housing 412. Because the spring 440 retains the second position 440A once therein without requiring hydraulic pressure in the valve 424, the clutch 423 is a normally-closed clutch in an engaged state when the spring 440 is in the second position 440A. The clutch 410 does not utilize balancing springs like springs 50 of FIGS. 1A and 1B, as such would reduce the clamp force of the spring 440 in the second position 440A, applied to the plates 425, 427 via the pins 452.

If the housing 412 were not grounded to the stationary member 414, the clutch 410 would be a double rotating normally-closed clutch, as the housing 412 would then be rotatable with shaft 416 when clutch plates 418 and 420 were engaged, and would otherwise function the same as described herein. Alternatively, the clutch 410 could be modified so that the shaft 417 was grounded, rather than to the housing 412. In that case, the clutch would include stationary-type clutch 423, but the second clutch 421 would be a rotating-type clutch.

Exemplary Transmission Embodiments

Referring to FIG. 8, a hybrid powertrain 510 is shown that includes an engine 512 and a hybrid electromechanical transmission 514. The transmission 514 includes a plurality of components generally surrounded by a stationary member 516, such as a transmission casing, shown only in fragmentary view in FIG. 8, but well understood by those skilled in the art. The transmission 514 includes an input member 517 and an output member 519, both of which are rotatable shafts or hubs. The input member 517 is continuously connected for common rotation with a rotor of a first electric motor/generator 520, referred to in the drawings as motor A. The transmission 514 further includes a second electric motor/generator 522, referred to in the drawings motor B. Both motor/generators 520, 522 are connected via a power inverter to an electric storage device, such as a battery. The controller controls the inverter so that stored electric energy in the electric storage device may be supplied to either motor/generator so that the motor/generator functions as a motor, or so that torque of the motor/generator is converted to stored electric power in a generator mode. The controller, inverter and energy storage device are not shown, but are well understood by those skilled in the art.

The transmission 514 further includes a planetary gear set 530, shown in lever form, having a first gear member 532, a second gear member 534, and a third gear member 536, establishing three nodes. The gear members 532, 534, and 536 include, in any order, a sun gear member, a ring gear member, and a carrier member that supports pinions intermeshing with the sun gear member and the ring gear member. The output member 519 is continuously connected for rotation with the second gear member 534. The second motor/generator 522 is continuously connected for rotation with the third gear member 536.

The transmission 514 includes three clutches 550, 552 and 554. Clutch 550 is a stationary-type clutch that is selectively engagable to ground the first gear member 532 to the stationary member 516. Clutch 552 is a rotating-type clutch that is selectively engagable to connect the first motor/generator 520 for common rotation with the first gear member 532. Clutch 554 is a rotating-type clutch that is selectively engagable to connect an output member of engine 512 for common rotation with the input member 517.

Referring to FIG. 9, the powertrain 510 is operable in various operating modes established by control and operation of the engine 512, the motor/generators 520, 522, and the clutches 550, 552, and 554. For example, an electric-only operating mode (referred to in FIG. 9 as EV-Low Speed) appropriate for relatively low rotational speeds of the output member, and therefore relatively low speed vehicle speeds, is established by engaging the first clutch 550 to ground the first gear member 532 to the stationary member 516. The second motor/generator 522 is controlled to function as a motor, providing torque to the third gear member 536 to cause rotation of the output member 519 at a relative speed to the first gear member 536 dependent on the gear ratio of the planetary gear set 530. In the embodiment shown, the clutch 550 is a single, normally-closed stationary clutch, such as clutch 10 of FIG. 1A. At low speeds, the spring force of spring 40 supplies sufficient engagement force to the clutch plates to maintain the clutch 550 in the engaged state, i.e., the normally closed position, without requiring hydraulic pressure. As the output speed increases, a hydraulic pump 560 is primed. The pump 560 is geared to the output member 519 via a gear or gear train 562 that increases the speed of the pump 560 relative to the output shaft 519. The pump 560 is in fluid communication with the clutch 550, and provides additional fluid pressure to maintain the clutch 550 in the engaged state as speed of the output member 519 increases.

The powertrain 510 is further operable in a hybrid series operating mode (referred to in FIG. 9 as Series Engine On) by engaging clutch 554, with normally-closed clutch 550 also engaged. The engine 512 supplies power to motor/generator 520, which is controlled to function as a generator, providing electrical power to the energy storage device (not shown). The controller controls the energy storage device to then provide electric power to motor generator 522, which is controlled to function as a motor to provide torque to gear member 536. At relatively low speeds, the spring force holding normally-closed clutch 550 in an engaged state is sufficient to ground gear member 532 to the stationary member 516, providing reaction torque. The pump 560 is primed as the speed of the output member 519 increases, which then provides hydraulic pressure to the clutch 560 to create additional apply force of the clutch 550 and reaction torque at the gear member 532.

The powertrain 510 is further operable in a hybrid output-split operating mode by engaging both clutches 552 and 554 and toggling the hydraulic valve associated with clutch 550 to a normally open position (e.g., as shown by the second position of the clutch 10 of FIG. 1A). The engine 512 thus provides torque at the first gear member 532, as may the motor/generator 520 if controlled to do so, while the motor/generator 522 is controlled to function as a motor or as a generator to add or receive torque, respectively, from the gear member 536. Torque from the engine 512 and the motor/generator 522 is thus combined through the planetary gear set 530 at the gear member 534. Because the clutch 550 is in the disengaged state, no hydraulic pressure is applied to the clutch 550, minimizing spin losses at the clutch 550.

The powertrain 510 is further operable in another electric-only operating mode, referred to in FIG. 9 as EV-High Speed, suitable for relatively high speeds of the vehicle and of the output member 519. To establish this operating mode, clutch 550 remains in the disengaged (normally open) position, and clutch 552 is engaged to connect motor/generator 520 to gear member 532. One of the motor/generators 520 or 522 is controlled to operate as a motor, while the other motor/generator 520 or 522 is controlled to operate as a motor or as a generator, as necessary to provide reaction torque at the gear member 532 or 536 to which it is connected. Thus, torque is provided to the output member 519. Finally, when clutch 550 is in the disengaged (normally open) state, and clutches 552 and 554 are disengaged, the powertrain 510 is in a neutral state, and the output member 519 is at zero speed.

The powertrain 510 is described above in a configuration in which clutch 550 is a normally-closed clutch and clutches 552 and 554 are normally-open clutches. In an alternative configuration, clutches 550 and 552 may be normally-open clutches, while clutch 554 may be a normally-closed clutch of the rotating type, such as clutch 310 of FIG. 6, with shafts 316 and 317 corresponding with the engine output member and the input member 517. In the various configurations in which clutch 550 is a normally-closed clutch, the gear member 532 may be a sun gear member, a ring gear member or a carrier member.

In yet another alternative configuration, both clutches 550 and 554 may be normally-closed clutches, while clutch 552 is a normally-open clutch.

Figures 10, 11:
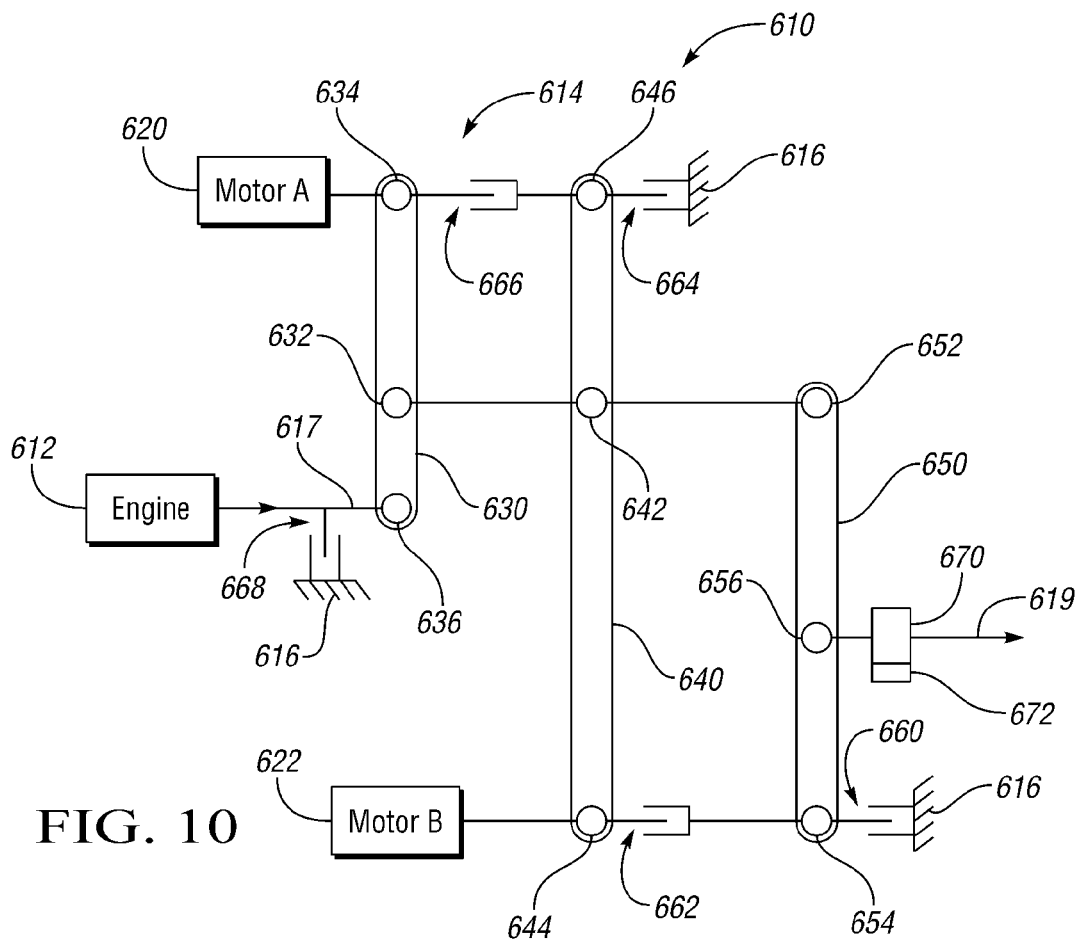
FIG. 10 is a schematic illustration of a second embodiment of a transmission having a normally-closed clutch.
FIG. 11 is a table showing operating modes and an engagement schedule for the clutches of FIG. 10.

Referring to FIG. 10, another embodiment of an exemplary hybrid powertrain 610 is shown that includes an engine 612 and a hybrid electromechanical transmission 614. The transmission 614 includes a plurality of components generally surrounded by a stationary member 616, such as a transmission casing, shown only in fragmentary view in FIG. 10 but well understood by those skilled in the art. The transmission 614 includes an input member 617 and an output member 619, both of which are rotatable shafts or hubs. The transmission 614 further includes a first motor/generator 620 and a second electric motor/generator 622. Both motor/generators 620, 622 are connected via a power inverter to an electric storage device, such as a battery. The controller controls the inverter so that stored electric energy may be supplied to either motor/generator so that the motor/generator functions as a motor, or so that torque of the motor/generator is converted to stored electric power in a generator mode. The controller, inverter and energy storage device are not shown, but are well understood by those skilled in the art.

The transmission 614 further includes three planetary gear sets 630, 640 and 650, shown in lever form, each having a first gear member, a second gear member, and a third gear member, establishing three nodes. Planetary gear set 630 has a first gear member 632, a second gear member 634, and a third gear member 636. The gear members 632, 634, and 636 include, in any order, a sun gear member, a ring gear member, and a carrier member that supports pinions intermeshing with the sun gear member and the ring gear member. Planetary gear set 640 has a first gear member 642, a second gear member 644, and a third gear member 646. The gear members 642, 644, and 646 include, in any order, a sun gear member, a ring gear member, and a carrier member that supports pinions intermeshing with the sun gear member and the ring gear member. Planetary gear set 650 has a first gear member 652, a second gear member 654, and a third gear member 656. The gear members 652, 654, and 656 include, in any order, a sun gear member, a ring gear member, and a carrier member that supports pinions intermeshing with the sun gear member and the ring gear member. The input member 617 is continuously connected for rotation with the third gear member 636. The output member 619 is continuously connected for rotation with the third gear member 656. The first motor/generator 620 is continuously connected for rotation with the second gear member 634. The second motor/generator 622 is continuously connected for rotation with the second gear member 644.

The transmission 614 includes five clutches 660, 662, 664, 666 and 668. Clutch 660 is a stationary-type clutch that is selectively engagable to ground the second gear member 654 to the stationary member 616. Clutch 662 is a rotating-type clutch that is selectively engagable to connect the second gear member 644 and the second motor/generator 622 for common rotation with the second gear member 654. Clutch 664 is a stationary-type clutch that is selectively engagable to ground the third gear member 646 to the stationary member 616. Clutch 666 is a rotating-type clutch that is selectively engagable to connect the second gear member 634 and the first motor/generator 620 for common rotation with the third gear member 646. Clutch 668 is a stationary-type clutch that is selectively engagable to ground the input member 617 to the stationary member 616.

A hydraulic pump 672 is geared to the output member 619 via a gear or gear train 670 that increases the speed of the pump 672 relative to the output shaft 619. The pump 672 is in fluid communication with the clutches 660, 662, 664, 666 and 668, and provides additional fluid pressure to maintain one or more of the clutches in the engaged state as selected in different operating modes of FIG. 11 as speed of the output member 619 increases.

Referring to FIG. 11, the powertrain 610 is operable in various operating modes established by control and operation of the engine 612, the motor/generators 620, 622, and the clutches 660, 662, 664, 666 and 668. For example, a neutral operating mode, also referred to as an engine start mode from which the engine may be started, is established when the clutch 664 is engaged, and one of motor/generator 620 or motor/generator 622 is operated as a motor to provide torque to the input member 617 and thus the engine 612, while the other of the motor/generators provides reaction torque. The clutch 664 may be a normally-closed single stationary clutch, such as clutch 10 of FIG. 1A with shaft 16 connecting to third gear member 646, thereby allowing the engine start mode to be effected when the pump 672 is not providing significant hydraulic pressure due to low speed of the output member 619.

When clutch 660 is engaged, the amount of engine torque provided at the output member 619 is controlled by operation of the motor/generators 620, 622 as motors or generators, similar to the function of a hydraulic torque converter, in what is referred to as a first electric torque converter mode ETC1. Another electric torque converter mode ETC2 is established when clutch 662 is engaged and one or both of the motor/generators 620, 622 controls the amount of engine torque provided at the output member 619. Clutch 660 may be a normally-closed stationary-type clutch, like clutch 10 of FIG. 1A and/or clutch 662 may be a normally-closed rotating-type clutch like clutch 310 of FIG. 6, with the shafts 316 and 317 connecting to gear members 644 and 654. In either case, the spring 40 in the normally-closed engaged state would have sufficient engagement force to transmit torque at the relatively low speeds in which the electric torque converter modes are operated.

The transmission 610 is further operable to provide four different electrically-variable operating modes EVT1, EVT2, EVT3 and EVT4. In the first electrically-variable operating mode EVT1, clutches 660 and 664 are engaged and the engine supplies torque while the motor/generators 620, 622 are controlled to operate as motors or generators, as required to meet operator demand. Either or both clutches 660 and 664 may be normally-closed stationary-type clutches like clutch 10 of FIG. 1A. The other electrically-variable operating modes EVT2, EVT3 and EVT4 are affected by engagement of clutches 660 and 666, clutches 662 and 666, and clutches 662 and 664, respectively. Any or all of the clutches may be normally-closed clutches of the stationary or rotating type, as appropriate.

The powertrain 610 may be operated in two different electric-only operating modes, in which the engine 612 is off and the motor/generators 620, 622 are each controlled to act as a motor or as a generator to provide torque at the output member 619. In the first electric-only operating mode EVT1 E OFF, clutches 660, 664 and 668 are engaged. Clutch 668 holds the input member 617 and the engine output shaft stationary, providing reaction torque at the gear member 636 while motor/generator 620 is controlled to operate as a motor. Reaction torque is also provided at gear members 646 and 654. In the second electric-only operating mode EVT3 E OFF, one of the motor/generators 620, 622 is operated as a generator to provide reaction torque at the respective gear member to which it is connected, while the other of the motor/generators 620, 622 is controlled to function as a motor to provide torque at the output member 619.

Three different fixed gear ratios are also available with the powertrain 610. For example, a first fixed gear ratio FG1 is established by engaging clutches 660, 664 and 666. Motor/generator 620 is grounded and motor/generator 622 freewheels. A second fixed gear ratio FG2 is established by engaging clutches 660, 662 and 666. Motor/generator 622 is grounded and motor/generator 620 freewheels. A third fixed gear ratio FG3 is established by engaging clutches 662, 664 and 666. Motor/generator 620 is grounded and motor/generator 622 freewheels. In the fixed gear ratios, the engine 612 provides torque to the output member 619. The motor/generators 620, 622 do not affect the speed of the output member 619.

The powertrains 510, 610 of FIGS. 8 and 10 represent only two exemplary embodiments of powertrains having transmissions including at least one normally-closed clutch. One or more of the normally-closed clutches of FIGS. 1A, 1B, and 4-7 may be used in a transmission to decrease spin losses and hydraulic pressure requirements, and thus increase fuel economy.

While the best modes for carrying out the invention have been described in detail, those familiar with the art to which this invention relates will recognize various alternative designs and embodiments for practicing the invention within the scope of the appended claims.

The invention claimed is:

1. A transmission configured for receiving power from an engine comprising:
an input member connectable with the engine;
an output member;
a stationary member;
a transmission gearing arrangement operatively connected between the input member and the output member and including a plurality of rotatable gear members;
a clutch having an engaged state and a disengaged state; wherein the clutch transmits torque between one of the gear members and another of the gear members, between said one of the gear members and the stationary member, or between the engine and the transmission when in the engaged state, and does not transmit torque when in the disengaged state;
wherein the clutch includes a mechanical member selectively movable to a first position in which the mechanical member is configured to retain the clutch in the engaged state without application of power, including at least hydraulic, pneumatic, and electrical power;
wherein the mechanical member is further selectively movable to a second position in which the mechanical member is configured to retain the clutch in the disengaged state without application of power, including at least hydraulic, pneumatic, and electrical power;
a hydraulically-actuated valve having a first and a second piston and a piston support connecting the first and the second piston; wherein the hydraulically-actuated valve at least partially defines a first annular chamber at the first piston and a second annular chamber at the second piston; wherein the piston support is operatively connected to the mechanical member such that the mechanical member is movable to the first position by application of hydraulic pressure in the first annular chamber to place the clutch in the engaged state and is movable to the second position by application of hydraulic pressure in the second annular chamber to place the clutch in the disengaged state; and a plurality of levers operatively connected to the mechanical member and to the piston support and configured to pivot at the housing and to provide a mechanical advantage between the hydraulically-actuated valve and the mechanical member.

2. The transmission of claim 1, wherein the mechanical member is a Belleville spring.

3. The transmission of claim 1, further comprising:
a first rotatable shaft continuously connected with said one of the gear members;
wherein the clutch includes a housing, a first set of plates continuously connected with the housing, and a second set of plates continuously connected with the first rotatable shaft; and wherein the second set of plates is selectively engaged with the first set of plates via the mechanical member when the clutch is in the engaged state.

4. The transmission of claim 3, further comprising:
a second rotatable shaft continuously connected with the said another of the gear members and continuously connected with the housing.

5. The transmission of claim 3,
wherein the first and second sets of plates are engaged with one another when the mechanical member is in the first position; and further comprising:
a second rotatable shaft continuously connected with said another of the gear members;
wherein the housing further includes a third set of plates continuously connected with the housing, and a fourth set of plates continuously connected with the second rotatable shaft; and
wherein the first and second sets of plates are disengaged and the third and fourth sets of plates are engaged when the mechanical member is in the second position.

6. The transmission of claim 1, wherein the transmission is a hybrid electro-mechanical transmission having at least one motor/generator operatively connected with the transmission gearing arrangement.

7. The transmission of claim 6, further comprising:
a transmission pump driven by the output member; and
wherein the transmission is characterized by the absence of any additional pump that is powered when the engine is not running.

8. The transmission of claim 1, further comprising:
a first and a second motor/generator; wherein the transmission gearing arrangement includes a planetary gear set having first, second and third gear members, including said one of the gear members; wherein the clutch is a first clutch;
a second and a third clutch;
wherein one of the clutches is selectively engagable to ground the first gear member to the stationary member;
wherein another of the clutches is selectively engagable to connect the first motor/generator for common rotation with the first gear member;
wherein still another of the clutches is selectively engagable to connect the engine with the first motor/generator;
wherein the output member is continuously connected for common rotation with the second gear member; and
wherein the second motor/generator is continuously connected for common rotation with the third gear member.

9. The transmission of claim 8, wherein the transmission is operable in a first electric-only mode when the clutch is selectively engagable ground the first gear member to the stationary member is engaged and the other clutches are disengaged; wherein the transmission is operable in a series hybrid mode when the clutch selectively engagable to ground the first gear member to the stationary member is engaged, the clutch selectively engagable to connect the first motor/generator for common rotation with the first gear member is disengaged, and the clutch selectively engagable to connect the first motor/generator with the engine is engaged;
wherein the transmission is operable in an electrically-variable output-split mode when the clutch grounding the first gear member to the stationary member is disengaged and the other clutches are engaged; and
wherein the transmission is operable in a second electric-only mode when the clutch connecting the first motor/generator for common rotation with the first gear member is engaged and the other clutches are disengaged.

10. The transmission of claim 9, wherein the clutch selectively engagable to ground the first gear member to the stationary member is the first clutch.

11. The transmission of claim 9, wherein the clutch selectively engagable to connect the first motor/generator with the engine is the first clutch.

12. The transmission of claim 9, wherein the clutch selectively engagable to ground the first gear member to the stationary member is the first clutch; and wherein the clutch selectively engagable to connect the first motor/generator with the engine includes another mechanical member selectively movable to a biasing position in which the another mechanical member is configured to retain the clutch selectively engagable to connect the first motor/generator with the engine in an engaged state without application of power, including at least hydraulic, pneumatic, and electrical power.

13. The transmission of claim 1, further comprising:
a first and a second motor/generator;
wherein the transmission gearing arrangement includes a first, a second and a third planetary gear set, each having a first, a second and a third gear member, including a sun gear member, a carrier member and a ring gear member, including the one and the another of the gear members;
five clutches including said clutch;
an interconnecting member continuously connecting for common rotation the first gear members of each of said planetary gear sets, the first gear members not being connected with said input member, with said output member, with either of said motor/generators nor with any of said clutches;
wherein a first of the clutches is selectively engagable to ground the second gear member of the third planetary gear set to the stationary member;
wherein a second of the clutches is selectively engagable to connect the second gear member of the second planetary gear set for common rotation with the second gear member of the third planetary gear set;
wherein a third of the clutches is selectively engagable to ground the third gear member of the second planetary gear set to the stationary member;
wherein a fourth of the clutches is selectively engagable to connect the second gear member of the first planetary gear set for common rotation with the third gear member of the second planetary gear set;

wherein a fifth of the clutches is selectively engagable to ground the third gear member of the first planetary gear set to the stationary member;

wherein the input member is continuously connected for common rotation with the third gear member of the first planetary gear set; wherein the output member is continuously connected for common rotation with the third gear member of the third planetary gear set;

wherein the first motor generator is continuously connected for common rotation with the second gear member of the first planetary gear set; and wherein the second motor/generator is continuously connected with the second gear member of the second planetary gear set.

14. A transmission configured to receive power from an engine, comprising:

an input member and an output member;

a transmission gearing arrangement including a plurality of intermeshing gear members;

a stationary member;

a plurality of clutches selectively engagable in different combinations to establish different operating modes between the input member and the output member; wherein each of the clutches is selectively engagable to transmit torque between different ones of the input member, the output member, and the gear members, or to ground one of the input member and the gear members to the stationary member;

wherein the plurality of clutches includes at least one normally-closed clutch having an engaged state and a disengaged state; wherein the normally-closed clutch includes a mechanical member;

a hydraulically-actuated valve having a first and a second piston and a piston support connecting the first and the second piston; wherein the hydraulically-actuated valve at least partially defines a first annular chamber at the first piston and a second annular chamber at the second piston; wherein the piston support is operatively connected to the mechanical member such that the mechanical member is movable to a first position by application of hydraulic pressure in the first annular chamber to place the normally-closed clutch in the engaged state and is movable to a second position by application of hydraulic pressure in the second annular chamber to place the normally-closed clutch in the disengaged state; and wherein the mechanical member is configured to retain the clutch in the engaged state without application of power, including at least hydraulic, pneumatic, and electrical.

15. The transmission of claim 14, further comprising:

a first and a second motor/generator; wherein the transmission gearing arrangement is a planetary gear set having first, second and third gear members; wherein the plurality of clutches includes a first clutch, a second clutch, and a third clutch; wherein the normally-closed clutch is the first clutch;

wherein one of the first, second, and third clutches is selectively engagable to ground the first gear member to the stationary member;

wherein another of the first, second, and third clutches is selectively engagable to connect the first motor/generator for common rotation with the first gear member;

wherein still another of the first, second, and third clutches is selectively engagable to connect the engine with the first motor/generator;

wherein the output member is continuously connected for common rotation with the second gear member; and wherein the second motor/generator is continuously connected for common rotation with the third gear member.

16. The transmission of claim 14, further comprising:

a first and a second motor/generator;

wherein the transmission gearing arrangement includes a first, a second and a third planetary gear set, each having a first, a second and a third gear member;

wherein the plurality of clutches includes five clutches, including the normally-closed clutch;

an interconnecting member continuously connecting for common rotation the first gear members of each of said planetary gear sets, the first gear members not being connected with the input member, with the output member, with either of the motor/generators or with any of the clutches;

wherein a first of the clutches is selectively engagable to ground the second gear member of the third planetary gear set to the stationary member;

wherein a second of the clutches is selectively engagable to connect second gear member of the second planetary gear set for common rotation with the second gear member of the third planetary gear set;

wherein a third of the clutches is selectively engagable to ground the third gear member of the second planetary gear set to the stationary member;

wherein a fourth of the clutches is selectively engagable to connect the second gear member of the first planetary gear set for common rotation with the third gear member of the second planetary gear set;

wherein a fifth of the clutches is selectively engagable to ground the third gear member of the first planetary gear set to the stationary member;

wherein the input member is continuously connected for common rotation with the third gear member of the first planetary gear set; wherein the output member is continuously connected for common rotation with the third gear member of the third planetary gear set;

wherein the first motor generator is continuously connected for common rotation with the second gear member of the first planetary gear set; and wherein the second motor/generator is continuously connected with the second gear member of the second planetary gear set.

17. A transmission configured for receiving power from an engine comprising:

an input member connectable with the engine;

an output member;

a stationary member;

a transmission gearing arrangement operatively connected between the input member and the output member and including a plurality of rotatable gear members;

a clutch having an engaged state and a disengaged state; wherein the clutch transmits torque between one of the gear members and another of the gear members, between said one of the gear members and the stationary member, or between the engine and the transmission when in the engaged state, and does not transmit torque when in the disengaged state;

wherein the clutch includes a mechanical member selectively movable to a first position in which the mechanical member is configured to retain the clutch in the engaged state without application of power, including at least hydraulic, pneumatic, and electrical power;

wherein the mechanical member is further selectively movable to second position in which the mechanical member is configured to retain the clutch in the disengaged state without application of power, including at least hydraulic, pneumatic, and electrical power;

a first rotatable shaft continuously connected with said one of the gear members;

wherein the clutch includes a housing, a first set of plates continuously connected with the housing, and a second set of plates continuously connected with the first rotatable shaft; and wherein the second set of plates is selectively engaged with the first set of plates via the mechanical member when the clutch is in the engaged state;

a hydraulically-actuated valve having a first and a second piston and a piston support connecting the first and the second piston; wherein the hydraulically-actuated valve at least partially defines a first annular chamber at the first piston and a second annular chamber at the second piston; wherein the piston support is operatively connected to the mechanical member such that the mechanical member is movable to the first position by application of hydraulic pressure in the first annular chamber to place the clutch in the engaged state and is movable to a second position by application of hydraulic pressure in the second annular chamber to place the clutch in the disengaged state; and a plurality of levers operatively connected to the mechanical member and to the piston support and configured to pivot at the housing and to provide a mechanical advantage between the hydraulically-actuated valve and the mechanical member.

* * * * *